United States Patent [19]

Varner

[11] 4,228,956

[45] Oct. 21, 1980

[54] IRRIGATION SYSTEM AND FLUID DISPERSION NOZZLE

[75] Inventor: James P. Varner, Hanover Park, Ill.

[73] Assignee: Eaton Corporation, Cleveland, Ohio

[21] Appl. No.: 965,221

[22] Filed: Nov. 30, 1978

Related U.S. Application Data

[63] Continuation-in-part of Ser. No. 879,556, Feb. 21, 1978, abandoned.

[51] Int. Cl.³ .......................... B05B 1/30; B05B 1/34; B05B 3/04
[52] U.S. Cl. .................................... 239/237; 138/46; 239/533.1; 239/570; 239/590.5
[58] Field of Search ............... 239/230, 231, 461, 467, 239/498, 502, 518, 522, 553.1, 552, 570, 590.5, DIG. 1, 237, 240; 138/45, 46; 137/843–845, 859

[56] References Cited

U.S. PATENT DOCUMENTS

| | | | |
|---|---|---|---|
| 432,422 | 7/1890 | Mertscheimer | 239/590.5 X |
| 1,541,702 | 6/1925 | Geisendorfer | 239/240 |
| 2,389,134 | 11/1945 | Brown | 138/45 |
| 2,454,929 | 11/1948 | Kempton | 138/45 |
| 4,087,050 | 5/1978 | Tsuji et al. | 239/490 |
| 4,091,996 | 5/1978 | Nelson | 239/230 X |

Primary Examiner—Andres Kashnikow
Attorney, Agent, or Firm—R. J. McCloskey; R. A. Johnston; E. C. Crist

[57] ABSTRACT

An agricultural irrigation system having a fluid dispersion nozzle for controlling the flow rate and generating a resultant fluid stream characterized by uniform dispersal along the stream path. The nozzle has a housing member (10) which defines an inlet passageway (16), a nozzle outlet orifice (32), and an intermediate fluid chamber (30). A resilient flow control member (34) is located within the fluid chamber (30) and has an orifice (36) centrally located therein and axially aligned with the inlet passage (16) and the nozzle orifice (32). The nozzle orifice has located along the inner periphery thereof a plurality of circumferentially equally spaced and radially inwardly projecting deflector members (38, 40, 42) which are effective for reducing a portion of the resultant fluid stream velocity therethrough. The fluid dispersion nozzle is mounted on a rotary sprinkler head (50) which receives a supply of pressurized irrigation fluid from an irrigation system primary conduit (56). The sprinkler head is rotated by a water turbine (52) responsive to fluid flow therethrough.

14 Claims, 6 Drawing Figures

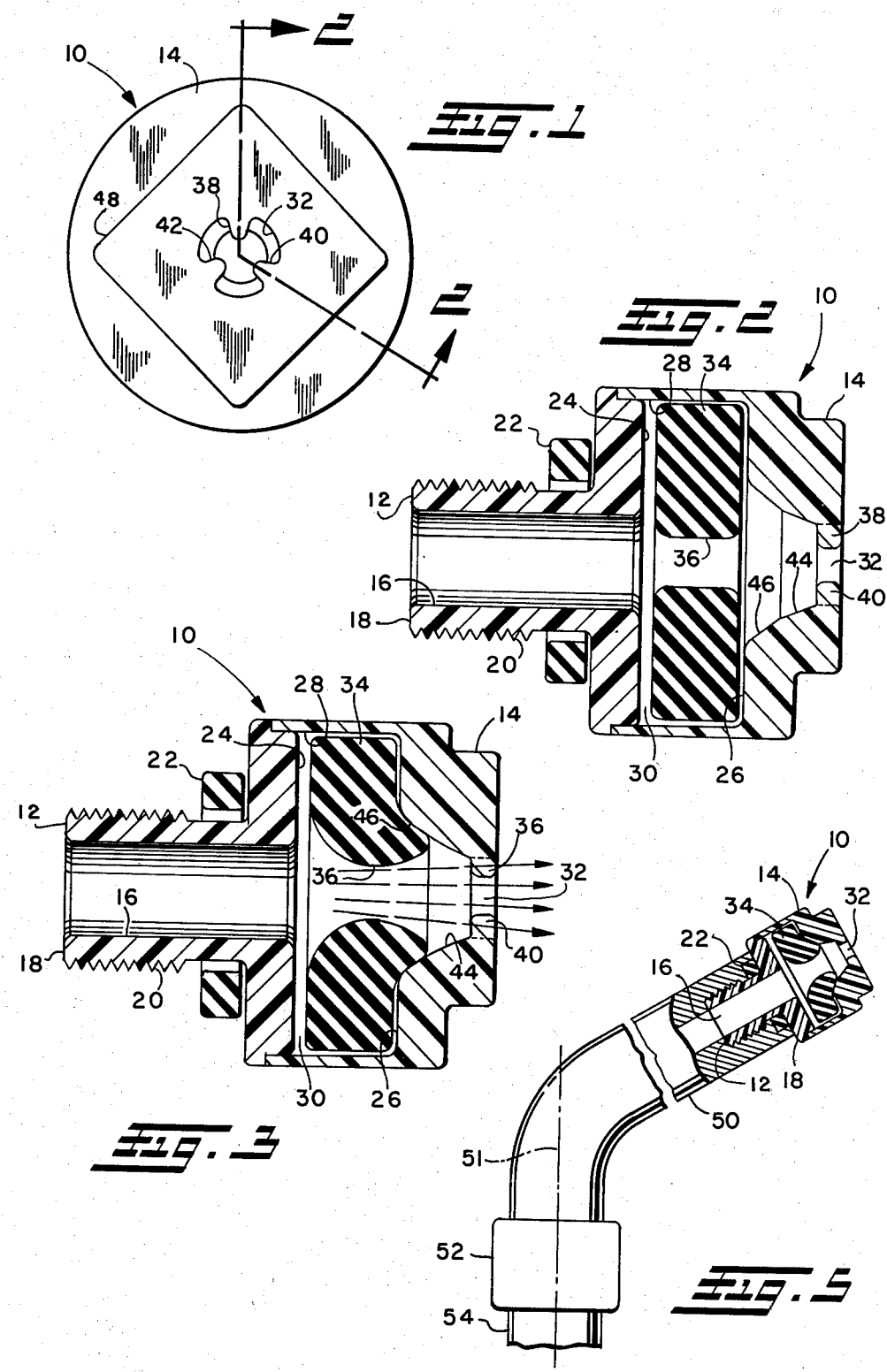

| FLOW RATE AS CONTROLLED BY FLOW CONTROL MEMBER 34 (GALLONS/MINUTE) | FLOW CONTROL MEMBER INTERNAL DIAMETER IN RELAXED STATE (INCH) | LUG INWARD EXTENSION (MEMBERS 38, 40, 42) (INCH) |
|---|---|---|
| 2.0 | 0.140 | 0.118 |
| 2.6 | 0.159 | 0.108 |
| 3.0 | 0.168 | 0.104 |
| 3.5 | 0.182 | 0.097 |
| 4.0 | 0.193 | 0.092 |
| 4.5 | 0.221 | 0.077 |
| 4.8 | 0.250 | 0.064 |
| 6.2 | 0.248 | 0.060 |
| 7.0 | 0.267 | 0.054 |
| 8.3 | 0.271 | 0.052 |
| 9.0 | 0.283 | 0.046 |
| 10.0 | 0.304 | 0.037 | ns
IRRIGATION SYSTEM AND FLUID DISPERSION NOZZLE

This application is a Continuation-In-Part of my co-pending application, Ser. No. 879,556, filed Feb. 21, 1978 now abandoned.

FIELD OF THE INVENTION

Agricultural sprinkler systems are presently used in areas where natural rainfall is insufficient to maintain crop growth. In those areas where water supplies are limited, it has become imperative that irrigation techniques be as efficient as possible in order to conserve water usage.

DESCRIPTION OF THE PRIOR ART

Among the sprinkling techniques presently in use are those using a device having a rotating nozzle which intermittently discharges a stream of water onto the crop area. An inertial mechanism attached to the sprinkler nozzle utilizes the inertial forces of the water stream to rotate the nozzle and hence the water stream throughout 360° of angular displacement. A problem encountered with present sprinkler nozzles has been that the high velocity water jet needed for sufficient stream range resulted in the area nearest the sprinkler receiving a limited amount of water with most of the water falling onto a ring or doughnut-shaped area of greater radius. Other types of sprinkler nozzles utilize a deflector arm which intermittently disrupts the water stream permitting the area near the sprinkler nozzle to receive a greater share of water. However, this type of sprinkler nozzle also lacks a substantially uniform water application pattern. A second separate nozzle is also commonly used in conjunction with a primary nozzle to direct water to the center of the spray pattern.

SUMMARY OF THE INVENTION

In the present invention a substantially uniform water distribution pattern is achieved without the need for additional structural elements external to the sprinkler nozzle for breaking up the flow stream. In the present invention a plurality of radially inwardly projecting lugs located on the outer periphery of the sprinkler nozzle orifice serve to deflect a portion of the water stream, thus permitting a significant amount of water to be uniformly dispersed along the entire length of the water stream. A further feature of the invention includes the utilization of a resilient flow control element which limits the flow rate through the sprinkler nozzle to a predetermined magnitude and controls the diameter of the resultant flow stream within a predetermined range. The flow control element permits the deflecting lugs to uniformly disperse fluid flow over a range of varying supply pressures.

The present invention is also embodied as a sprinkler irrigation system which incorporates the features of the fluid dispersion nozzle as described above. A unique feature of the presently described invention irrigation system is that the impulse arm, which is ordinarily connected to the sprinkler head of most prior art sprinkler systems, is eliminated as uniform water dispersion is more effectively achieved by the deflector members spaced circumferentially around the outlet orifice of the fluid dispersion nozzle. The impulse arm and its associated hardware are replaced by a far simpler water turbine drive mounted directly within the sprinkler head member.

BRIEF DESCRIPTION OF THE DRAWINGS

FIG. 1 is a downstream-end view of the device of the present invention;

FIG. 2 is a cross-sectional view taken along section indicating lines 2—2 of FIG. 1 showing the invention with the control member undeflected by any forces accompanying fluid flow;

FIG. 3 is a view similar to FIG. 2 showing the control member in a deflected state under the forces accompanying fluid flow;

FIG. 5 is a partial cross-sectional view in elevation of a sprinkler head incorporating the dispersion nozzle of FIGS. 1 through 3.

DETAILED DESCRIPTION OF THE DRAWINGS

Figures 4, 6:
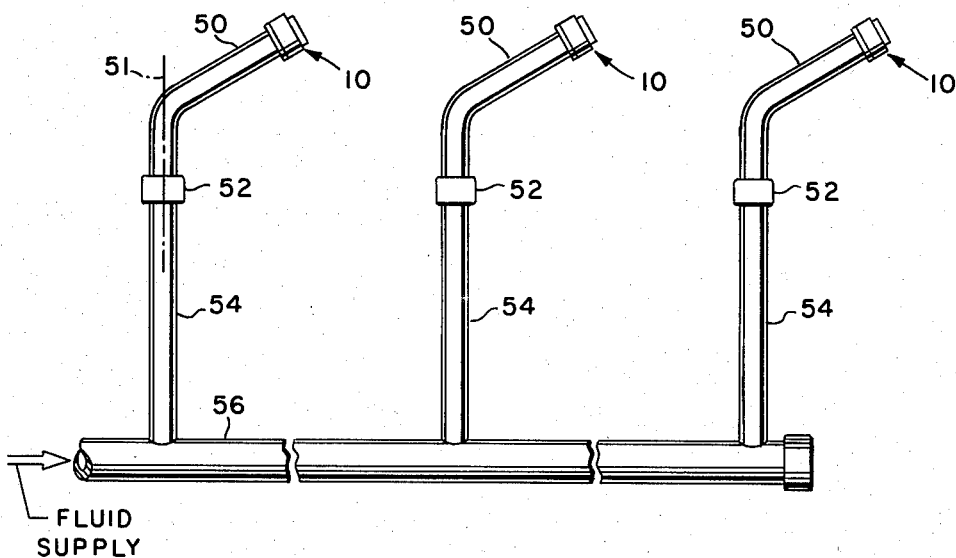
FIG. 4 is a chart showing in tabular form the relationship between flow rate, lug size, and flow control member orifice size.
FIG. 6 is a schematic view in elevation of a portion of an irrigation system incorporating fluid dispersion nozzle of FIGS. 1 and 3.

In referring to the drawings, like reference numerals designate like parts in the figures.

Referring now to FIG. 2, a flow dispersion nozzle is indicated generally by reference numeral 10. An inlet housing section 12 is fluidly sealed and joined to an outlet housing section 14 by any convenient expedient, for example, bonding, a threaded connection, or ultrasonic welding where the housing sections are molded from a thermoplastic material. In service it has been found desirable to have the junction of the inlet housing to the outlet housing leak-free at 100 p.s.i. static water pressure of 80 p.s.i. air pressure. An inlet passageway 16 is centrally located and formed in inlet housing section 12. A stem portion 18 of inlet section 12 includes a taper threaded end 20 which permits attachment to a corresponding internal thread located in a pressurized water supply conduit, not shown. A resilient sealing washer 22 is fitted over the stem portion 18 and serves to fluidly seal the dispersion nozzle upon connection to a pressurized water supply conduit. A downstream surface 24 traverse to inlet passageway 16 is defined by housing section 12. A second transverse surface 26 and an internal diameter 28 are defined by outlet housing section 14 and, together with first transverse surface 24, define a control chamber 30. As best shown in FIG. 3, an exit orifice 32 is formed in the downstream face of outlet housing section 14 and, in the preferred practice of the invention, is circular in shape. A resilient, disk-shaped flow control member 34 is located within control chamber 30. A centrally located control orifice 36 is formed in the flow control member and has an internal diameter sized less than the internal diameter of inlet passageway 16. Resilient flow control devices of the type described above are known in the art and rely for their means of control upon a restrictive orifice contained therein which changes size in response to varying fluid pressure differentials thereacross. Thus it is essential that the internal area of any flow passageway immediately upstream from the control orifice be sized substantially greater than the area or internal diameter of the flow control member so that the flow control action occurs solely across the flow control member and not in any upstream fluid passageway.

In the preferred practice of the invention, exit orifice 32 is sized to have an effective area about 20% greater than the area of control orifice 36 as measured while the flow control member 34 is in a relaxed condition. This feature enables the fluid stream exiting from the control member 34 to pass through exit orifice 32 while substantially avoiding contacting the periphery thereof.

As shown in FIGS. 1 and 2, a series of lugs 38, 40 and 42 are disposed in preferably equally spaced circumferential arrangement around the periphery of exit orifice 32 and each lug extends radially inwardly therefrom. The number, configuration and amount that the lugs extend into the flow stream may be varied, but it has been found that a desired proportion should be maintained in order to provide a balance between fluid dispersion and total range of the fluid stream. In the preferred practice of the invention, it has been found that three lugs provide a symmetrical dispersion pattern; however, a greater number of lugs may also be found effective. It has been determined that a highly effective and satisfactory dispersion pattern can be achieved by sizing the lugs to extend radially inward by an amount of 0.026 inch (0.66 mm) from the internal diameter of flow control diameter 36. This arrangement enables the exit orifice to be held constant over a wide range of flow control element sizes while varying the lug size. An exit orifice having an internal diameter of 0.323 inch (8.20 mm) has been found particularly suitable for flow rates of 2.0 through 10.0 gallons per minute. There is illustrated in FIG. 4 a chart showing the flow control orifice 36 internal diameter measured in the relaxed state and the amount of inward lug extension from exit orifice 32 for a given or desired flow rate in gallons per minute. A suitable lug width for the range of extensions shown in FIG. 4 has been determined to be 0.060 inch (1.52 mm). Thus, from FIG. 4, for a desired flow rate the flow control internal orifice diameter and lug extension may be determined and will be satisfactory for a 0.060 (1.52 mm) by width.

The relationship between lug extension and the area of the flow control internal diameter in the relaxed state may be expressed in terms of the ratio expressed as a percent of the rib area projecting into the flow control internal diameter to the area of the flow control internal diameter. A range of 0.5% to 15.0% generally provides acceptable dispersion and a range of 0.6% to 8.0% provides optimal dispersion. The functional effect of the lugs on the resultant fluid stream passing through the device will be subsequently described in greater detail.

Exit orifice 32 has a first diverging surface 44 immediately upstream from lugs 38, 40 and 42, and a second diverging surface 46 located upstream from the first diverging surface. Surfaces 44 and 46 provide support for the inner downstream face of the control member as it deflects thereagainst under the forces transmitted by fluid flow.

A plurality of wrench flats in the form of preferably a square-pattern 48 are formed on the downstream face of the outlet housing section and which provide engaging surfaces for a wrench or other attachment tool.

In operation, when the device is connected to a pressurized supply of water, the flow enters into inlet passageway 16 where it then encounters the restrictive effects of control orifice 36. The resilient flow control member 34 then axially deflects in a downstream direction an amount dependent upon the fluid pressure upstream therefrom with the deflection varying the control orifice size. The change in control orifice size enables the flow control member to compensate for changes in upstream pressure, thereby maintaining flow at a substantially constant rate. As stated previously, the internal diameter of exit orifice 32 in sized greater than the diameter of the fluid stream passing therethrough to prevent needless reduction of the stream velocity. Lugs 38, 40 and 42 are, however, sized to extend into the fluid stream a predetermined amount dependent upon the amount of dispersion desired. The effect of the lugs is to form channels in the fluid stream causing partial deflection thereof whereupon the deflected portion has a reduced velocity component, resulting in a uniformly dispersed fluid stream. In the preferred practice of the invention, greater control of the dispersion pattern is achieved by sizing the exit orifice diameter greater than the diameter of the fluid stream, thereby allowing only the lug members to deflect the stream flow. However, the deflecting lugs are still effective even if the stream does, in fact, contact the periphery of the exit orifice whereupon the exit orifice will also influence the stream pattern.

There is illustrated in FIG. 3 the dispersion nozzle in an operative condition showing the flow control member deflected in a downstream direction with first diverging section 46 supporting the flow control member against further axial deflection. The resultant fluid stream is illustrated generally by the arrows passing through exit orifice 32.

Referring now to FIGS. 5 and 6, an embodiment of the invention is shown, wherein the flow dispersion nozzle 10 is threadedly connected to a sprinkler head shown schematically by reference numeral 50. A means for continuously rotating sprinkler head 50 about a vertical axis 51 is employed and is represented schematically by reference numeral 52 and functions in response to water flowing therethrough. Rotating means 52 may be of any type well known in the art, for example, those incorporating a turbine element mounted with associated driving components. A secondary supply conduit 54 is connected to rotating means 52. Referring now particularly to FIG. 6, the remaining portions of the irrigation system are shown schematically and include a primary fluid conduit 56 fluidly connected to a pressurized source of irrigation water (not shown). Each secondary fluid conduit 54 is in turn connected to primary fluid conduit 56. The horizontal spacing between adjacent supply conduits and the vertical height of each conduit 54 are determined by the range of the water stream exhausting from each sprinkler head 50. The details of the fluid connections between conduits are not shown, since details of this type form no part of the invention and are well known to those having ordinary skill in the art. In addition, the basic fluid flow path represented by FIG. 6 can be made part of a far more extensive supply conduit grid without departing from the teachings of the invention.

Other embodiments and variations of this invention will occur to those skilled in the art and which are within the scope of the following claims.

I claim:

1. A nozzle device for controlling the dispersion of a pressurized supply of fluid, comprising:

(a) housing means defining an inlet passage and a control chamber downstream from said inlet passage and further defining an outlet orifice located downstream from said control chamber and substantially aligned with said inlet passage in the direction of flow;

(b) flow control means disposed in said control chamber, said flow control means having a control orifice therein for limiting the fluid flow rate therethrough, said control orifice being effective for guiding said flow to an outwardly projecting fluid stream;

(c) said outlet orifice having an internal transverse dimension greater than the periphery of said fluid stream such that said fluid stream is substantially unobstructed while flowing therethrough; and (d) channel forming means for deflecting a portion of said fluid flow passing through said outlet orifice, said channel forming means being disposed around the periphery of said outlet orifice and being effective for forming channels in and dispersing substantially uniformly said fluid stream downstream of said outlet orifice.

2. A device as defined in claim 1, wherein said channel forming means includes a plurality of radially inwardly projecting lugs, said lugs being spaced circumferentially about the inner periphery of said outlet orifice.

3. A device as defined in claim 1, wherein said channel forming means includes a plurality of radially inwardly projecting lugs, said lugs being spaced circumferentially about the inner periphery of said outlet orifice, with the ratio of the area of said lugs transverse to the flow direction and projecting radially inwardly from said control orifice to the area of said control orifice being in the range of 0.5% to 15.0%.

4. A device as defined in claim 1, wherein said channel forming means includes a plurality of radially inwardly projecting lugs, said lugs being spaced circumferentially about the inner periphery of said outlet orifice, with the ratio of the area of said lugs transverse to the flow direction and projecting radially inwardly from said control orifice to the area of said control orifice being in the range of 0.6% to 8.0%.

5. A device as defined in claim 1, wherein said deflecting means are positioned adjacent the downstream edge of said outlet orifice.

6. A device as defined in claim 1, wherein said flow control means includes a resilient, disc-shaped member.

7. A device as defined in claim 1, wherein the area transverse to the direction of flow of said outlet orifice is at least 20% greater than the area of said control orifice as determined in a relaxed condition.

8. An irrigation system for supplying fluid from a pressurized source to an area to be irrigated, comprising:

(a) primary fluid conduit means having an inlet adapted for connection to said source;

(b) at least one secondary conduit means each having a fluid inlet and a fluid outlet, with the inlet of each of said secondary conduit means being in fluid communication with said primary conduit means and operating for transferring said pressurized fluid from said source to said secondary outlet;

(c) sprinkler head means having a fluid passageway therethrough with one of said sprinkler head means being disposed in fluid communication with and rotatably connected to the outlet of each of said secondary conduit means;

(d) means for rotating each of said sprinkler head means in response to said fluid flowing through said sprinkler head means fluid passageway;

(e) said sprinkler head means including,
  (i) means defining a control chamber adjacent the sprinkler head means fluid outlet;
  (ii) means defining an outlet orifice downstream from said control chamber at the sprinkler head means fluid outlet;

(f) flow control means disposed in said control chamber, said flow control means having a control orifice therein for limiting the fluid flow rate therethrough, said control orifice being effective for guiding said flow to an outwardly projecting fluid stream; and (g) said outlet orifice having an internal transverse dimension greater than the periphery of said fluid stream such that said fluid stream is substantially unobstructed while flowing therethrough; and (h) channel forming means for deflecting a portion of said fluid flow passing through said outlet orifice, said channel forming means being disposed around the periphery of said outlet orifice, said channel forming means being effective for forming channels in and dispersing substantially uniformly said fluid stream downstream of said orifice.

9. A device as defined in claim 8, wherein said channel forming means includes a plurality of radially inwardly projecting lugs, said lugs being spaced circumferentially about the inner periphery of said outlet orifice.

10. A device as defined in claim 8, wherein said channel forming means includes a plurality of radially inwardly projecting lugs, said lugs being spaced circumferentially about the inner periphery of said outlet orifice, with the ratio of the area of said lugs transverse to the flow direction and projecting radially inwardly from said control orifice to the area of said control orifice being in the range of 0.5% to 15.0%.

11. A device as defined in claim 8, wherein said channel forming means includes a plurality of radially inwardly projecting lugs, said lugs being spaced circumferentially about the inner periphery of said outlet orifice, with the ratio of the area of said lugs transverse to the flow direction and projecting radially inwardly from said control orifice to the area of said control orifice being in the range of 0.6% to 8.0%.

12. A device as defined in claim 8, wherein said deflecting means are positioned adjacent the downstream edge of said outlet orifice.

13. A device as defined in claim 8, wherein said flow control means includes a resilient, disc-shaped member.

14. A device as defined in claim 8, wherein the area transverse to the direction of flow of said outlet orifice is at least 20% greater than the area of said control orifice as determined in a relaxed condition.

* * * * *